United States Patent [19]

Mesnel et al.

[11] Patent Number: 5,003,792

[45] Date of Patent: Apr. 2, 1991

[54] SHAPED SECTION FOR THE GUIDANCE AND SEALING OF A MOVABLE WINDOW, IN PARTICULAR OF A MOTOR VEHICLE DOOR, AND ITS METHOD OF MANUFACTURE

[76] Inventors: Francois Mesnel, 6bis, rue Salignac Fenelon, 92200 Neuilly S/Seine; Gerard Mesnel, 16, rue Victor Hugo, 78420 Carrieres S/Seine, both of France

[21] Appl. No.: 433,002

[22] Filed: Nov. 8, 1989

[30] Foreign Application Priority Data

Nov. 8, 1988 [FR] France ............................ 88 14566

[51] Int. Cl.⁵ ............................................ E06B 7/16
[52] U.S. Cl. ............................................ 49/479; 49/475
[58] Field of Search .......... 49/440, 479, 441, 485, 49/490, 491, 475, 374, 376, 502

[56] References Cited

U.S. PATENT DOCUMENTS 4,649,668  3/1987  Skillen et al. .................. 49/441

FOREIGN PATENT DOCUMENTS 2188082  9/1987  United Kingdom ............... 49/485

Primary Examiner—Kenneth J. Dorner
Assistant Examiner—Gerald A. Anderson
Attorney, Agent, or Firm—Foley & Lardner

[57] ABSTRACT

The invention relates to a shaped section for the guidance and sealing of a movable window, in particular of a motor vehicle door, formed from an elastomer extruded onto a metal reinforcement and comprising a first part which forms a clamp, capable of being fastened onto the shaped section of the frame of the movable window, and a second part with a U-shaped section, turned in the opposite direction to said first part and serving as a guidance and sealing member for the movable window, the base of the U of the second part comprising a portion with the metal reinforcement removed and forming a resilient flexible hinge made from said elastomer. The part of the reinforcement of the second part which does not adjoin the reinforcement of the first part, forming a clamp for the shaped section, has been adapted by swaging, over at least a part of its length, to the shape of the window frame.

6 Claims, 2 Drawing Sheets

SHAPED SECTION FOR THE GUIDANCE AND SEALING OF A MOVABLE WINDOW, IN PARTICULAR OF A MOTOR VEHICLE DOOR, AND ITS METHOD OF MANUFACTURE

BACKGROUND OF THE INVENTION

1. Field of the Invention

The present invention relates to a shaped section for guiding and sealing of a movable window, such as those in motor vehicle doors and more particularly, to a shaped section for use with a motor vehicle door having a flush-type window.

2. Discussion of the Related Art

In published French Patent Application No. 2,596,138, the present Applicant has described a shaped section made from an extruded elastomer and having a metal reinforcement. A first part of the shaped section, forming a clamp, enables it to be fastened onto the frame of the movable window, and a second part, having a U-shaped section and termed a "slide", serves as a guidance and sealing member for the movable window. Between these two parts, a U-shaped third part, which is rigidly integral with the first part, may accommodate an auxiliary shaped section forming a weatherstrip of the type termed a "lapping member", at least one lip of which laps the outer face of the closed window. This lapping member may also form an integral part of the shaped section.

According to this patent application, the first part which forms a clamp and the second part which forms the guidance member are mutually articulated by means of a resilient hinge produced by bending the central portion of the metal reinforcement of the shaped section prior to the extrusion of the elastomer onto the reinforcement. This bent portion then is cut off after the extrusion so that the reinforcement is removed. However, a fraction of the elastomeric covering remains, which thereby forms the connecting hinge.

In its published application for a certificate of addition No. 8,716,334 in France No. 2,623,596, the Applicant subsequently proposed an improved variant of this shaped section in which the resilient hinge permits not only a relative pivoting of the parts of the shaped section which it joins, but also a translational movement of the slide substantially in the plane of displacement of the movable window. A shaped section of this type may be produced in a simple manner by forming a metal strip which is intended to form the reinforcement into the appropriate shape by cutting this strip longitudinally into two fractions at a location corresponding to that of the resilient flexible hinge. The elastomer is simultaneously extruded onto the two fractions of strip which are in an appropriate adjacent position and have been previously coated with an agent promoting the adhesion of this elastomer onto the metal of the strip. This coating may be carried out before or after the shaping of the metal strip.

In a further embodiment of such a method, the cutting of the metal strip takes place immediately after the extrusion of the elastomer, which covers the whole of the two portions of strip so as to produce a single shaped section comprising the articulating hinge and the sealing lips.

The translational movement of the slide which serves as a guidance member for the movable window occurs at the end of the movement of the window, when it reaches the closed position. The edge of the window presses this part towards the adjacent part of the frame with a simultaneous pivoting movement relative to the part forming a clamp. This movement ensures an improved sealing of the window while at the same time facilitating its displacement.

The present invention relates to a variant embodiment of a shaped section of this type intended to be fitted to door frames having an unrounded corner part with a small radius of curvature. In such door frames, it is known to reinforce the corresponding parts of the weatherstrips by molding an additional part, which expands to the shape of the frame, onto the sealing lip or onto the tubular element which this lip adjoins. (See, e.g., published French Patent Application No. 2,624,191.)

The shaped section described in the abovementioned application for a certificate of addition No. 8,716,334 is suitable for rounded corners of a window frame which have a large radius of curvature but is not entirely appropriate for window frames having corners with an acute angle or a small radius of curvature.

SUMMARY OF THE INVENTION

Accordingly, it is an object of the present invention to overcome this disadvantage by making the shaped sections of this type capable of hugging perfectly the shape of the bodywork in the corners of such window frames.

A further object of the present invention is to provide a shaped section of this type which is entirely capable of ensuring the guidance and sealing of a movable window of a motor vehicle door, even when the frame of this window has corners with an acute angle or a small radius of curvature.

The foregoing and additional objects are attained by providing a shaped section for the guidance and sealing of a movable window, such as for a motor vehicle door, formed from an elastomer extruded onto a metal reinforcement. The shaped section comprises a first part forming a clamp, which is capable of being fastened onto the shaped section of the frame of the movable window, and a second part with a U-shaped section, turned in the opposite direction to the first part and serving as a guidance and sealing member for the movable window. The base of the "U" of the second part comprises a portion with the metal reinforcement removed and forming a resilient flexible hinge made from the elastomer, wherein the part of the reinforcement of the second part which does not adjoin the reinforcement of the first part has been adapted to the shape of the window frame by swaging over at least a part of its length.

As described in the above-mentioned application for a certificate of addition, it will be possible for the shaped section to be fitted with a so-called window lapping member. This member forms an independent element attached to the shaped section and is housed in a part having a U-shaped section and an opening turned in the opposite direction to that of the part forming a clamp. Alternatively, the member may be formed as an integral part of the shaped section by extrusion with the latter.

A further subject of the invention is a method for manufacturing a shaped section of this type for the guidance and sealing of a movable window in which a metal strip, which is to form the reinforcement of the shaped section, is fashioned into the appropriate shape.

This strip is then cut into two portions at a location corresponding to that of the resilient hinge and the elastomer is extruded simultaneously onto the two portions in an appropriate adjacent position, wherein, after the elastomer has hardened, the portion of the reinforcement of the second part which does not adjoin the reinforcement of the part forming a clamp is adapted by swaging, over at least a part of its length, to the profile of the window frame, especially in the corners of the frame.

In particular, it will be possible for this swaging operation to be applied to the portion of the reinforcement of the shaped section corresponding to at least one corner of the window frame.

Further objects and advantages of the present invention will become apparent to those skilled in the art from the specification and drawings which follow.

DETAILED DESCRIPTION OF THE PREFERRED EMBODIMENTS

Figure 1:
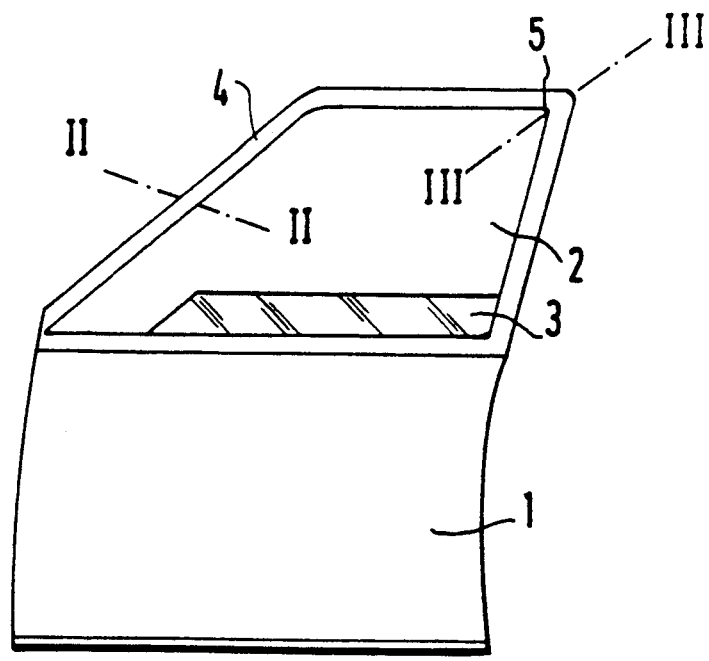
FIG. 1 is a view of a door having a conventional window frame, one corner of which is virtually unrounded and has a small radius of curvature.

FIG. 1 shows a motor vehicle door 1 equipped with an opening 2 which may be closed by a movable window 3. The frame 4 of this opening has an unrounded corner 5 with an acute angle and the shaped section according to the present invention which is fitted therein aims to ensure a satisfactory guidance of the window and a good sealing, even in this unrounded corner 5.

Figure 2:
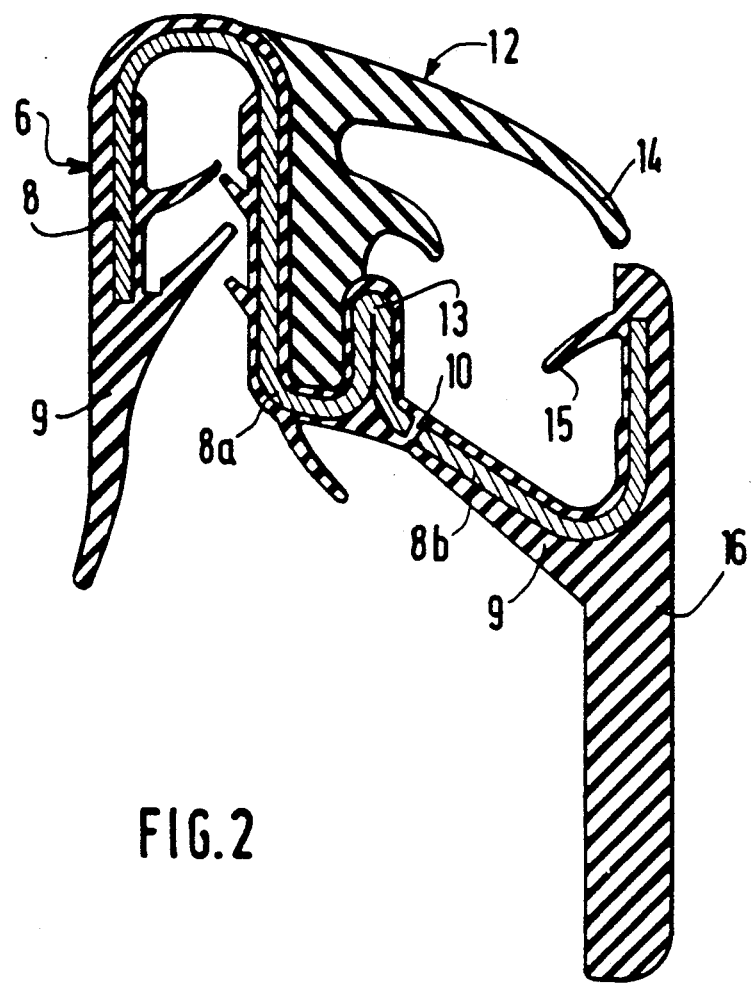
FIG. 2 is a cross-section of the shaped section of the present invention combined with this door frame along the line II—II in FIG. 1.
Figure 3:
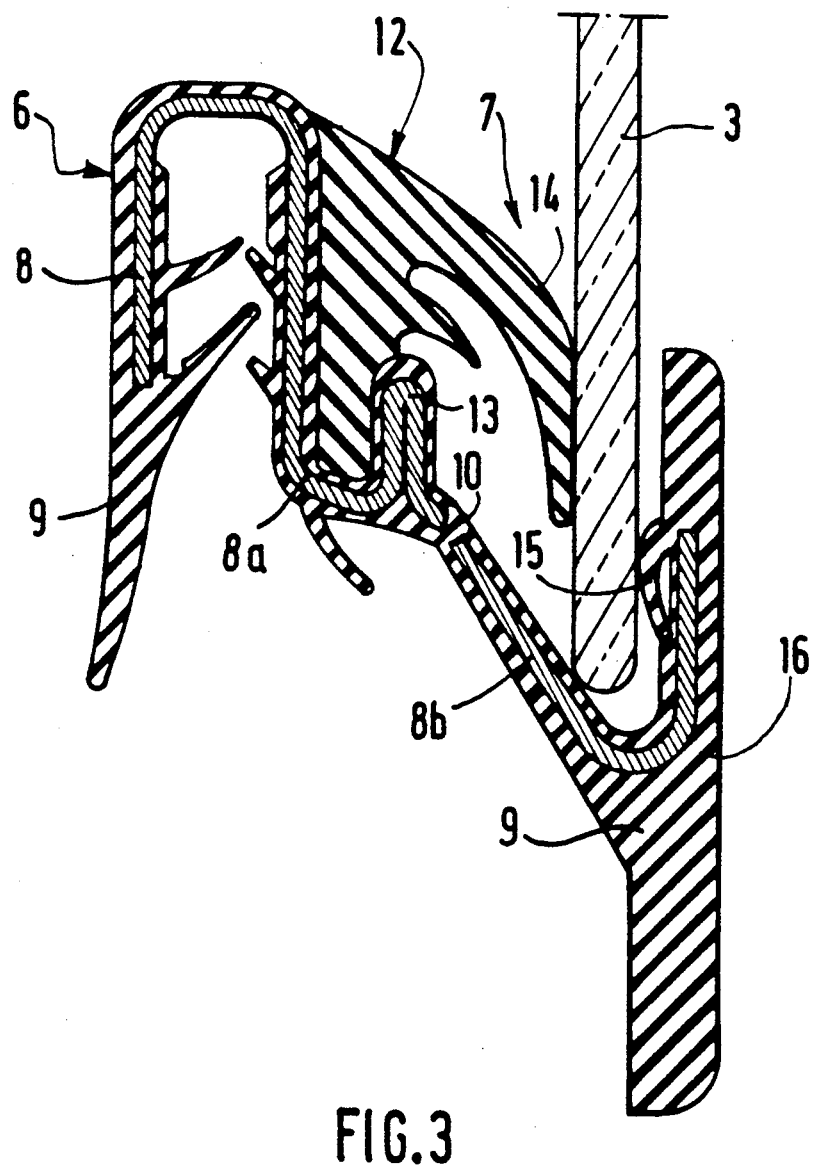
FIG. 3 is a similar cross-section along the line III—III in FIG. 1.

As can be seen in FIG. 2, this shaped section comprises a U-shaped clamp part 6, which is made integral with the frame 4 of the door 1 by fitting over a rebate of this frame. This clamp part 6 is attached to a second U-shaped slide part 7 (FIG. 3), serving as a guidance and sealing member for the movable window 3.

The U-shaped sections of the parts 6 and 7 are inverted relative to each other.

As described in the above-mentioned application for a certificate of addition No. 8,716,334, the clamp 6 and the slide 7 comprise a metal reinforcement 8 covered with an elastomer 9. The reinforcement 8 is divided in the base region of the U of the slide 7 so as to define two lengths 8a and 8b which are mutually articulated in the region of their separation point by an elastomeric hinge 10. Thus, the length 8b is able to pivot relative to the length 8a and the length 8a to move translationally when the window 3 comes to bear against the bottom of the slide 8, at the end of its travel (i.e., the position where the window is closed (FIG. 3)).

According to the present invention, at least in the part of the shaped section corresponding to the corner 5 of the window frame 4 (FIG. 3), the length 8b of the reinforcement which does not adjoin the clamp 6 is adapted, for example by swaging, to the profile of the bodywork in this corner 5 of the frame 4. In other words, the length 86 at the corner 5 is longer than the length 86 at the straight portion of the frame 4, as can be seen by comparing FIGS. 2 and 3. The shaped section thus hugs the shape of the window frame 4 perfectly over its entire length, including the corner 5 where the reinforcement 8b has been deformed so as to be adapted to the frame, as FIGS. 2 and 3. The bottom of the slide 7 is thus elongated and inclined towards the corner of the window frame and the window 3 may easily housed therein in an entirely sealing manner when the window is in the closed position.

The shaped section comprises, in addition, a sealing element or lapping member 12 which adjoins the clamp 6 and is anchored thereon by a part 13 of the reinforcement 6 which has been bent back. A lip 14 of this lapping member, having flocked fibers (not shown) on its surface, comes into contact with the inner face of the window 3 in the closed position (FIG. 3), whereas a lip 15 of the slide, also flocked and adjoining the lateral strip 16 opposite the lapping member 12, ensures the sealing on the outer face of the window 3.

A shaped section of this type and its flexible articulation 10 are produced by precoating a continuous strip of metal with an agent promoting the adhesion of an elastomer to metal. The metal which is to form the reinforcement may, for example, be aluminum. The metal strip is then bent into the desired shape using, for example, a roller system. Just before introducing the shaped strip into an extruder head, the metal strip is cut using a shearing wheel along a line corresponding to the location of the hinge 10. Thereafter, the extruder head covers the strip with an elastomer to form the desired profile, while simultaneously producing the lapping member and the various lips.

After extrusion of the elastomer, the resulting shaped section is prevulcanized, coated by flocking fibers at the locations which are to come into contact with the window 3 and cut into rectilinear elementary sections.

The elementary sections are then adapted to the profile of the door frame and, in the corners thereof, the length 8b of the reinforcement is deformed by swaging so as to hug the shape of this corner.

It should become obvious to those skilled in the art that the present invention is not limited to the preferred embodiments shown and described.

What is claimed is:

1. A shaped section for guiding and sealing a movable window, comprising:
   clamping means for fastening said shaped section to a shaped portion of a frame of the movable window;
   a substantially U-shaped section adapted to receive the movable window, said U-shaped section being adjacent said clamping means;
   a base of said U-shaped section including a resilient flexible hinge, said base having a main substantially linear part and a corner portion; and
   said corner portion of the base adjacent said flexible hinge and one the side of said flexible hinge furthest from said clamping means being elongated relative to the main substantially linear part of said base to follow the shape of at least one corner of said frame.

2. The shaped section according to claim 1, wherein said clamping means and said U-shaped section are formed from an elastomeric material extruded onto a reinforcement member.

3. The shaped section according to claim 2, wherein said flexible hinge is formed from the elastomeric material.

4. The shaped section according to claim 1, wherein the corner portion of the base is inclined towards the corner of said frame.

5. The shaped section according to claim 2, further comprising a sealing member adjoining said clamping means, said sealing member including a lip adapted to contact an innerface of the movable window.

6. The shaped section according to claim 5, further comprising a second lip adjoining a leg of the U-shaped section opposite said sealing member.

* * * * *